United States Patent [19]

Cheetham

[11] Patent Number: 4,476,020

[45] Date of Patent: Oct. 9, 1984

[54] STRAINER ASSEMBLY FOR GRANULAR MEDIA FILTERS

[75] Inventor: John H. Cheetham, Twickenham, England

[73] Assignee: Paterson Candy International Limited, Laverstoke Mill, England

[21] Appl. No.: 438,711

[22] Filed: Nov. 2, 1982

[30] Foreign Application Priority Data

Dec. 8, 1981 [GB] United Kingdom ............... 8136963

[51] Int. Cl.³ .......................................... B01D 23/20
[52] U.S. Cl. .................................. 210/289; 210/291; 210/293; 239/580; 239/581
[58] Field of Search .................. 210/289, 291, 293; 239/580, 581

[56] References Cited

U.S. PATENT DOCUMENTS 1,996,545 4/1935 Knowlton .......................... 239/580
3,498,462 3/1970 Larrowe et al. ................... 210/289

FOREIGN PATENT DOCUMENTS 671997 5/1952 United Kingdom .
900655 7/1962 United Kingdom .
924799 5/1963 United Kingdom .
1056532 1/1967 United Kingdom .
1261320 1/1972 United Kingdom .

Primary Examiner—Ivars C. Cintins
Attorney, Agent, or Firm—Fidelman, Wolffe & Waldron

[57] ABSTRACT

The strainer assembly comprises a body (1) which is to be mounted in the floor (14) of the filter and which has open upper and lower ends. A hollow open ended stem (3) has an external screw-thread (4) which engages with an internal screw-thread (2) in the body. The stem projects outwardly from the body below the lower end of the body and is axially adjustable relative to the body so that the effect of filter construction errors can be eliminated. A flexible tab (11) on the stem engages with ribs (10) on the body to prevent unintentional relative rotation of the stem and body. A strainer (8) is fitted to the upper end of the body and a flow control orifice (5) is provided in the stem. The area of the orifice is smaller than the total open area of the strainer.

8 Claims, 1 Drawing Figure

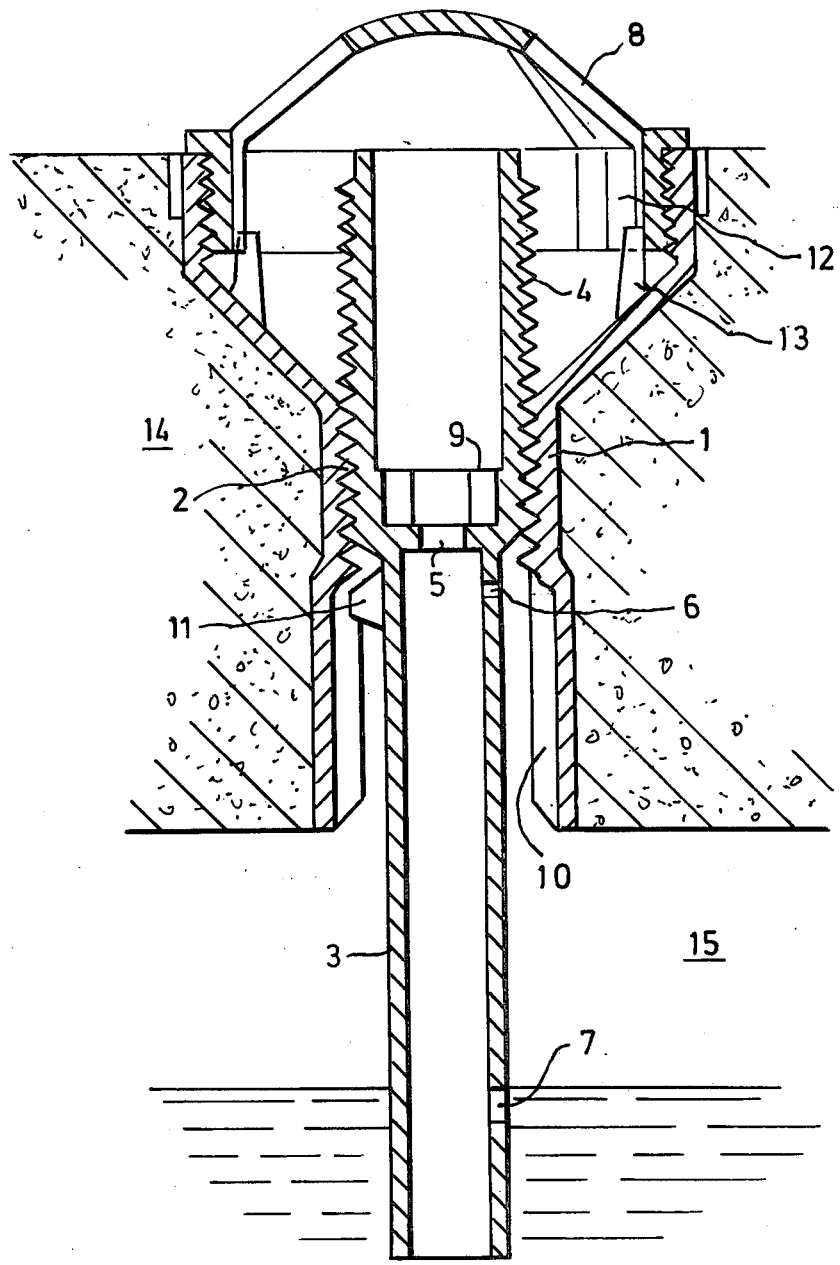

STRAINER ASSEMBLY FOR GRANULAR MEDIA FILTERS

This invention relates to a strainer assembly for granular media filters.

Granular media filters as used extensively for the purification of water for example comprise a carefully graded particulate media such as sand, anthracite etc. contained in a pressure tank or open chamber which must possess an underfloor collection and/or backwash distributing system. In use the water is usually passed downwards and the suspended solids are removed and retained within the granular media. These solids must eventually be washed off the media otherwise it would become clogged and the filter would cease to function. Washing is conventionally achieved by passing water upwards through the filter media, sometimes preceeded by air, sometimes accompanied by air.

The collection of filtrate and the distribution of backwash air and/or water is commonly achieved by specially designed strainers which fit into the floor of the filter tank or chamber and connect with pipes, ducts or a plenum space beneath the floor. It is particularly advantageous that the strainers fit closely to the floor and do not project into the media otherwise a stagnant layer is left close to the floor.

In order that an even flow of air is distributed across the floor each strainer is provided with a stem containing side air orifices. The size of these orifices is calculated so that the pressure loss, due to the passage of air, creates a depression in the water level so that an air space is formed between the water and the under side of the floor sufficient to allow free access of air without the formation of waves and ripples. Under this condition the bottom of each stem is sealed by the water so that air only enters the stem through the side orifices and not through the bottom. It is however important that each strainer stem by reasonably level otherwise there is effectively a different driving pressure into each stem and hence the air flow through each stem will vary from stem to stem.

During backwash with water only there is no air space and the overall hydraulic loss through the stem is taken into account, in relation to velocities under the floor and through ducts and pipes so that there is an even discharge through each strainer into the filter. Calculations are based upon standard procedures for the design of manifolds which are familiar to engineers dealing with fluid systems. Each strainer is provided with a series of fine slots to retain the filter media and prevent it entering the underdrain system. It is preferred that the point at which pressure is dissipated is other than at these slots so that the hydraulic characteristics of the strainer are not effected by the presence or absence of the filter media or partial blocking of the strainers. A separate orifice is often included so that this end is achieved.

When water and air are applied simultaneously the situation is more like that of air on its own except that the water pressure loss and air pressure losses are modified. Nevertheless the new air pressure loss maintains the air/water interface in the same way and the degree of levelling of the strainers is still important.

In practical situations, particularly with civil engineering construction, it may be difficult to achieve high accuracy of levels in concrete floors particularly in territories and areas where highly developed skills are not available. This can lead to imperfect air distribution and in the extreme conditions floors may have to be reassembled or re-laid.

When buried pipes or ducts are employed to collect filtrates and supply the backwash water, the combined application of air and water is difficult because friction losses and pressure recovery due to the Bernoulli effect could cause the air/water interface to vary along the length of the pipe or duct. The slope changes with flow conditions and it is also difficult to predict with any accuracy.

According to the invention, a strainer assembly for a granular media filter, comprises a body for being mounted in a floor of the filter and having open upper and lower ends, a hollow open ended stem mounted in the body and projecting outwardly of the body below the lower end of the body, a strainer fitted to the upper end of the body, and means whereby the vertical position of the stem can be adjusted relative to the body.

The body may be cast in a concrete floor or set flush with a steel floor so that the strainer assembly presents a low profile in the base of the filter chamber or tank at all times but which may be fully adjustable over a range selected at the design stage so that the effect of filter construction errors can be eliminated. Also, the accuracy of discharge of air can be adjusted more accurately than hitherto possible without having to screw complete strainer assemblies in and out of the floor with the consequent danger of them coming out completely or being liable to damage when only partly inserted. Furthermore, the new strainer assembly will facilitate adjustment to counteract slopes in an air water interface due to hydraulic friction or Bernoulli effects.

Preferably, the adjustment means comprises interengaging screw threads on the inner wall of the body and the outer wall of the stem. In this case, preferably, means are provided to prevent unintentional relative rotation of the stem and body which may be caused by vibration as air and/or water pass through the assembly.

Advantageously, the stem also has a flow control orifice between its ends of smaller area than the total open area of the strainer.

The invention will now be more particularly described, by way of example, with reference to the accompanying drawing which is a cross section of one embodiment of a strainer assembly according to the present invention.

The strainer assembly includes a body 1 open at opposite ends and having a divergent portion near its upper end. The body 1 has an internal screw-thread 2 and may be cast within a concrete floor slab 14 or set flush with a steel floor. A separate stem 3 with an extended external screw thread 4 may be inserted into the body 1 from above or below and positioned at any desired height by mutual engagement between the screw threads 2 and 4 within the range of the screw threads. The stem is provided with a water control orifice 5, an upper air orifice 6 and lower air orifices 7. In service the head loss through the orifice 6 is sufficient to control the air/water interface in pipes, ducts or a plenum space 15 beneath the floor at an intermediate level or at the most to depress it down to the level of the orifices 7. A slotted removable top cap or strainer 8 is provided with apertures to retain the filer media (distributed over the floor) whilst having a total open area considerably in excess of the area of the water control orifice 5. In use the stem 3 is not retained in any positive manner and vibration as air and water passing through could cause it to rotate and hence rise or fall. Such rotation is prevented by a locking device which in the embodiment shown comprises a flexible tab 11 on the outer wall of stem 3 which engages against parallel vertical ribs 10 on the inner wall of the body 1. As the stem is screwed in or out, during first assembly, the tab 11 therefore exerts a positive frictional resistance regardless of the fit of the main screw thread. A similar frictional locking system may be employed to prevent rotation of the top cap 8 relative to the body 1 using a tab 13 on the inner wall of body 1 bearing against ribs 12 on the inner wall of strainer top cap 8.

After assembly of the floor the stems may conveniently be levelled accurately by filling the filter with water to an appropriate level just above the floor and the stems adjusted with a tool engaging with a slot or a convenient socket such as a square or a hexagon 9 formed as an integral part of the stem 3 so that the tool maintains the same level against the water line when set in each of the stems.

A further feature of the nozzle is that the stems may be adjusted from below at a later date after installation of the filter media should there be subsidence or any change in operating conditions.

The complete assembly contributes a significant improvement over existing designs in that the independence of the control stem with its metering orifices enables lower standards of levelling to be accommodated, smaller ducts to be used or a higher accuracy of distribution of air and water to be achieved. These factors can lead to cost savings, improved performance or both.

I claim:

1. A strainer assembly for a granular media filter, comprising:
   a body for being mounted in a floor of said filter and having open upper and lower ends;
   a hollow open ended stem mounted in said body and projecting outwardly of said body below said lower end of said body;
   a strainer top cap fitted to said upper end of said body;
   means whereby the vertical position of said stem can be adjusted relative to said body, said adjustment means comprising interengaging screw-threads on the inner wall of said body and the outer wall of said stem; and
   means whereby unintentional relative rotation of said stem and said body is prevented, said rotation preventing means comprising a flexible tab on said outer wall of said stem and a plurality of ribs engageable by said tab on said inner wall of said body.

2. A strainer assembly for a granular media filter, comprising:
   a body for being mounted in a floor of said filter and having open upper and lower ends;
   a hollow open ended stem mounted in said body and projecting outwardly of said body below said lower end of said body;
   a strainer top cap fitted to said upper end of said body;
   means whereby the vertical position of said stem can be adjusted relative to said body, said adjustment means comprising interengaging screw-threads on the inner wall of said body and the outer wall of said stem; and
   means whereby unintentional relative rotation of said stem and said body and said strainer top cap, and said body is prevented, said rotation preventing means comprising flexible tabs on said outer wall of said stem and said inner wall of said body and a plurality of ribs engageable by said tabs on said inner wall of said body and the inner wall of said strainer top cap.

3. A strainer assembly for a granular media filter, comprising:
   a body mounted in the floor of said filter so as not to project above said floor and having open upper and lower ends,
   a hollow, open-ended stem mounted in said body and projecting outwardly of said body below said lower end of said body, and
   a strainer top cap fitted to said upper end of said body;
   the inner wall of said body and the outer wall of said stem having interengaging screw-threads; and
   the arrangement of said strainer assembly being such that the vertical position of said stem can be adjusted from above relative to said body independently of said strainer top cap after said strainer assembly has been mounted in said floor.

4. The strainer assembly of claim 3, wherein means are provided to prevent unintentional relative rotation of said stem and said body comprising a flexible tab on said outer wall of said hollow, open-ended stem and a plurality of ribs engageable by said tab on said inner wall of said body.

5. The strainer assembly of claim 3, wherein means are provided to prevent unintentional relative rotation of said hollow, open-ended stem and said body and of said strainer top cap and said body comprising flexible tabs on said outer wall of said stem and said inner wall of said body and a plurality of ribs engageable by said tabs on said inner wall of said body and the inner wall of said strainer top cap.

6. The strainer assembly of claim 3, wherein said hollow, open-ended stem has intermediate its ends, upper and lower air orifices and also a water flow control orifice smaller in cross-sectional area than that of said stem.

7. The strainer assembly of claim 3, wherein said hollow, open-ended stem is provided with means engageable by a tool, from above or below, for rotating said stem relative to said body, whereby the vertical position of said stem may be adjusted relative to said body independently of said strainer top cap after said strainer assembly has been mounted in said floor.

8. A strainer assembly for a granular media filter, comprising:
   a body mounted in the floor of said filter so as not to project above said floor and having open upper and lower ends;
   a hollow, open-ended stem mounted in said body and projecting outwardly of said body below said lower end of said body having intermediate its ends, upper and lower air orifices and also a water flow control orifice smaller in cross-sectional area than that of said stem;
   a strainer top cap fitted to said upper end of said body;
   the inner wall of said body and the outer wall of said stem having interengaging screw-threads;
   means for adjusting the vertical position of said stem relative to said body independently of said strainer top cap after said strainer assembly has been mounted in said floor, said adjusting means comprising means within said hollow, open-ended stem engageable by a tool, from above or below, for rotating said stem relative to said body; and means whereby unintentional relative rotation of said hollow, open-ended stem and said body and of said strainer top cap and said body comprising flexible tabs on said outer wall of said stem and said inner wall of said body and a plurality of ribs engageable by said tabs on the said inner wall of said body and the inner wall of said strainer top cap.

* * * * *